Aug. 27, 1963   F. F. HALL   3,101,903
SELF-PROPELLED IRRIGATION TRAILER
Filed July 10, 1962   5 Sheets-Sheet 1

Fred F. Hall
INVENTOR.

BY *Clarence A. O'Brien*
*and Harvey B. Jacobson*
Attorneys

Aug. 27, 1963

F. F. HALL 3,101,903

SELF-PROPELLED IRRIGATION TRAILER

Filed July 10, 1962

Fred F. Hall
INVENTOR.

BY *Clarence A. O'Brien*
and *Harvey B. Jacobson*
Attorneys

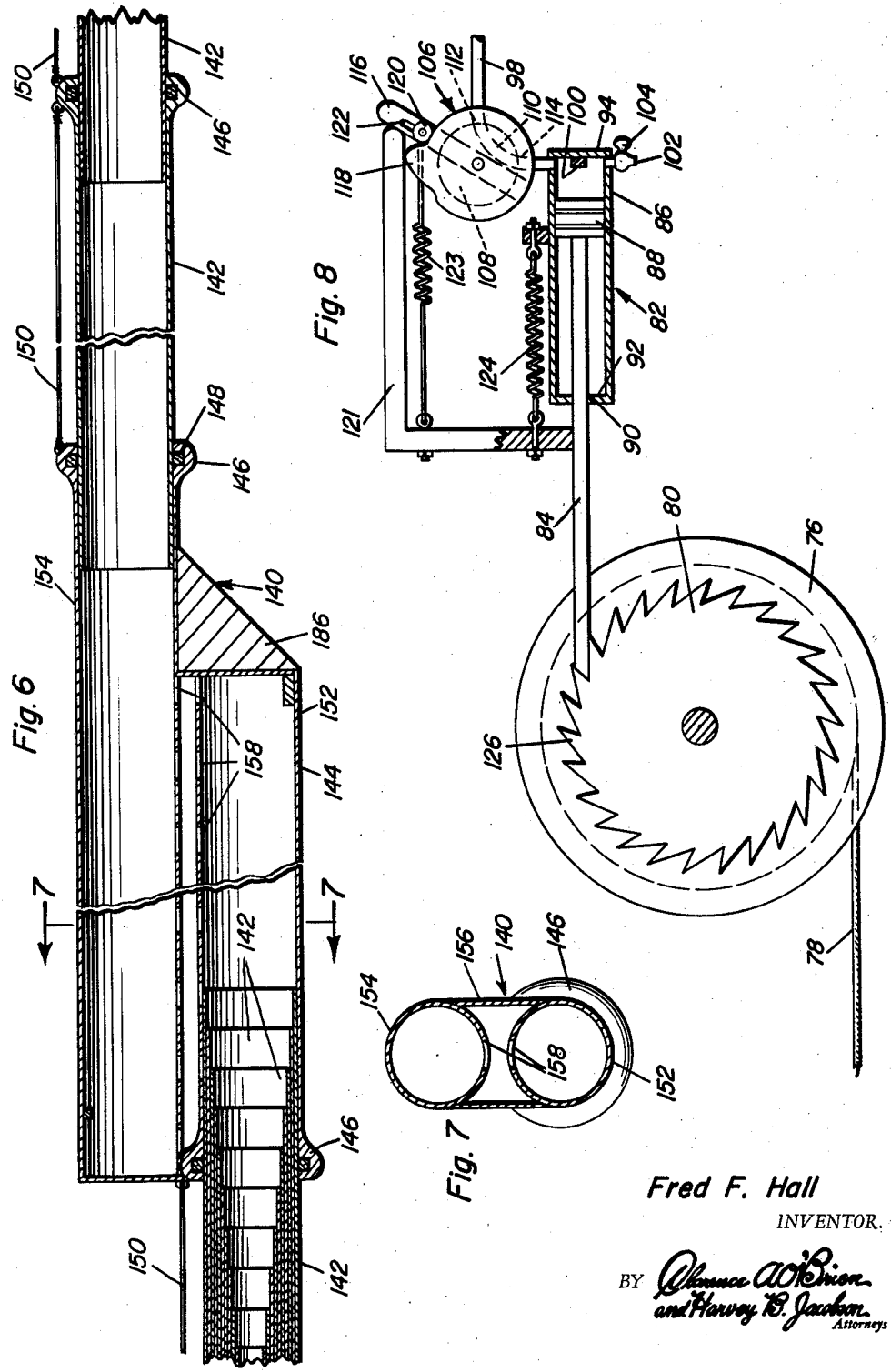

United States Patent Office 3,101,903
Patented Aug. 27, 1963

3,101,903
SELF-PROPELLED IRRIGATION TRAILER
Fred F. Hall, Chaseley, N. Dak.
Filed July 10, 1962, Ser. No. 208,890
5 Claims. (Cl. 239—183)

This invention relates to a novel and useful self-propelled irrigation trailer and more specifically to a trailer or vehicle which is adapted to carry large numbers of telescopically engaged elongated conduits sections which may be extended and retracted. The extendable conduit sections may be extended to a distance of one-half mile or more of continuous pipe sections and retracted onto the trailer or vehicle into a total over-all length of approximately 50 feet.

The self-propelled irrigation trailer of the instant invention utilizes an elevated elongated and transversely extending hollow manifold boom which is provided with a plurality of liquid outlets for dispensing water or the like over a given pattern of area which pattern is disposed to the rear of and on opposite sides of the support wheels of the vehicle and does not include any portion of the ground over which the vehicle will travel and only those portions of the ground on opposite sides and to the rear of the vehicle relative to its direction of movement. In this manner, the ground over which the irrigation vehicle moves will not be wetted and the vehicle will therefore more readily travel over the supporting ground surface.

The telescopically engaged elongated liquid conduit sections are engaged with each other in a manner whereby they may be readily extended and retracted relative to each other and are secured together against full retraction of one conduit section from within another. In addition, certain of the conduit sections each includes a pair of laterally spaced conduit halves which are communicated with each other and which are, at remote end portions, telescopically engaged with an adjacent conduit section. In this manner, a certain number of adjacent conduit sections may be successively telescopically engaged with each other into a retracted state with the conduit sections adjacent the laterally spaced conduit halves telescoped into or about the remote ends of the conduit halves. With this construction, any number of conduit sections may be telescopically engaged with each other without exceeding minimum and maximum diametric dimensions.

The self-propelled irrigation trailer is provided with winch means including a winding drum with a flexible pull member wound thereabout and after the desired number of telescopically engaged conduit sections have been extended and the pull member has been unwound to a length equal to the extended portion of the telescopically engaged conduit sections, liquid actuated motor means which is drivingly connected to the winding drum of the winch means is actuated and the liquid actuated motor means receives its power from a portion of the water passing through the telescopically engaged conduit sections. Accordingly, it may be seen that the trailer or vehicle may be pulled along a length of extended telescopically engaged conduit sections as water is being dispensed from the trailer to water the surface of the ground over which the trailer is traveling while the extended telescopically engaged conduit sections are being simultaneously retracted.

The main object of this invention is to provide a self-propelled irrigation vehicle which will be capable of discharging irrigation water over a large area without requiring the presence of an attendant.

A further object of this invention, in accordance with the immediately preceding object, is to provide a self-propelled irrigation trailer which is provided with a plurality of telescopically engaged sections that may be extended to a length of a half mile or more and connected to a source of water under pressure at the extended end.

A still further object of this invention, in accordance with the immediately preceding object, is to provide the self-propelled irrigation vehicle or trailer with motor means whereby it may be propelled over the ground and in a direction toward the extended end of the telescopically engaged conduit sections whereby as the irrigation vehicle moves forwardly the telescopically engaged conduit sections will be moved to their retracted positions.

Yet another object of this invention is to provide a motive power for the irrigation vehicle comprising a winding drum on which a length of flexible pull member is wound and to which winding drum a fluid motor is drivingly connected which receives its source of fluid under pressure from the end of the telescopically engaged conduit sections supported from the irrigation trailer thereby enabling the irrigation trailer to pull itself toward the extended end of the telescopically engaged conduit sections.

Another object of this invention, in accordance with the immediately preceding object, is to provide the irrigation trailer with steerable front wheels including a control which may be operatively engaged with the extended telescopically engaged conduit sections in a manner so that the steering of the irrigation vehicle is accomplished by movement of the vehicle along the extended conduit sections thereby enabling the irrigation vehicle to traverse a path defined by the line of extended telescopically engaged conduit sections which are being urged to their retracted positions by forward movement of the irrigation trailer.

A still further object of this invention is to provide the self-propelled irrigation trailer with ground engaging support wheels which are disposed in front and rear pairs of steerable opposite side wheels with means interconnecting the wheels of each pair of wheels for simultaneously steering and with each pair of the support wheels including means for steering the wheels through arcs of at least 90° about an upstanding axis between positions with the wheels pointing forwardly of the vehicle and positions pointing to the side of the vehicle whereby the vehicle may be moved laterally as well as forwardly.

Yet another object of this invention is to provide the irrigation trailer with liquid dispensing means including outlet means positioned so as to discharge water from the trailer over a pattern disposed rearwardly of and to the opposite sides of the support wheels for the trailer whereby the trailer will at all times be moving over ground which has not been watered.

A final object of this invention to be specifically enumerated herein is to provide a self-propelled irrigation trailer in accordance with the preceding objects which will conform to conventional forms of manufacture, be of simple construction and easy to operate so as to provide a device that will be economically feasible, long lasting and relatively trouble-free in operation.

These together with other objects and advantages which will subsequently become apparent reside in the details of construction and operation as more fully hereinafter described and claimed, reference being had to the accompanying drawings forming a part hereof, wherein like numerals refer to like parts throughout, and in which:

FIGURE 6 is an enlarged fragmentary longitudinal vertical sectional view taken substantially upon a plane passing through a group of telescopically engaged conduit sections of the instant invention illustrating the manner in which adjacent ones of the telescopically engaged conduit sections may be fully retracted and fully extended and also the manner in which double conduit sections may be utilized to enable adjacent conduit sections to be telescopically engaged therein from opposite directions without appreciably increasing the length of the double conduit section beyond the length of one of the single conduit sections telescopically engaged therein:

FIGURE 7 is a transverse vertical sectional view taken substantially upon the plane indicated by the section line 7—7 of FIGURE 6;

FIGURE 8 is an enlarged fragmentary longitudinal vertical sectional view of the propelling winch and the liquid powered motor means which is operatively connected thereto; and FIGURE 9 is a fragmentary side elevational view of a modified form of double conduit sections onto whose opposite ends adjacent conduit sections may be telescopically engaged.

Referring now more specifically to the drawings the numeral 10 generally designates the self-propelled irrigation trailer of the instant invention.

Figure 4:
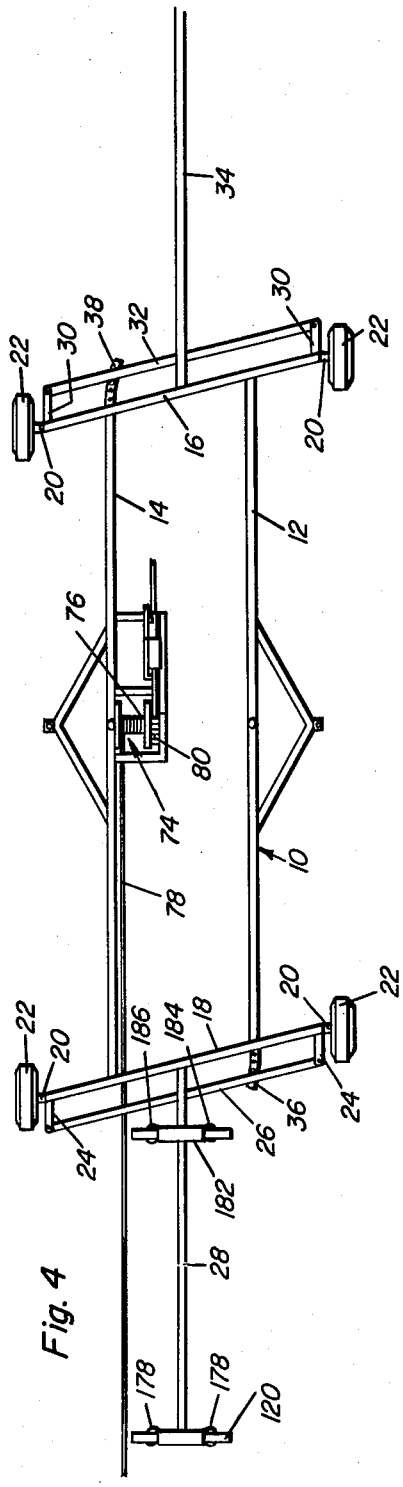
FIGURES 4 and 5 are diagrammatic top plan views of the irrigation trailer showing the manner in which both pairs of front and rear ground engaging support wheels may be steered from forwardly directed positions to laterally directed positions enabling lateral movement of the trailer as well as longitudinal movement of the trailer.
Figure 5:
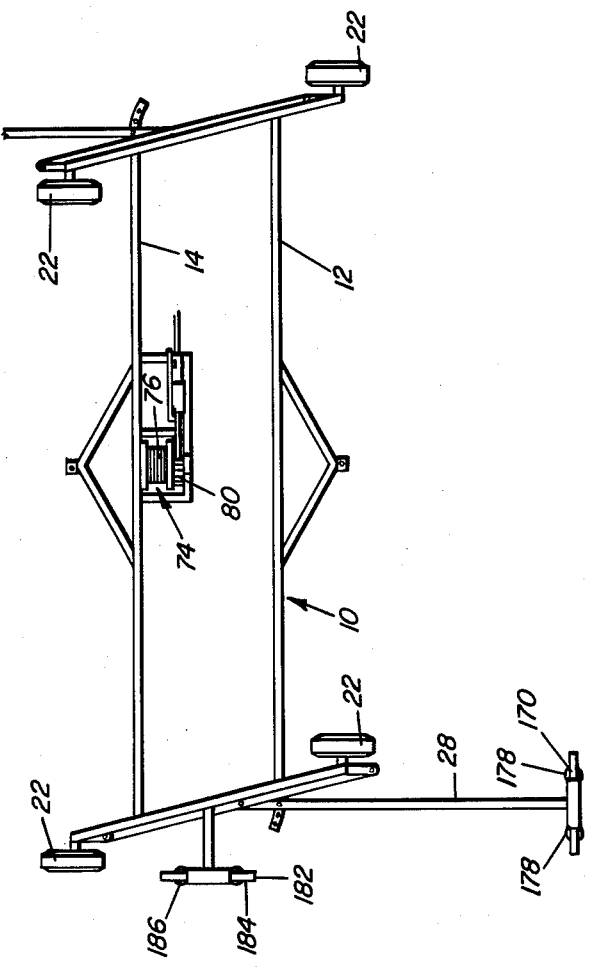

With attention now directed to FIGURES 4 and 5 of the drawings it may be seen that the irrigation trailer 10 includes a pair of longitudinal side frame members 12 and 14 which are interconnected at opposite ends by means of transverse frame members 16 and 18. Each of the transverse frame members 16 and 18 comprises an axle member and each has a pair of spindle members 20 pivotally secured to its opposite ends. Each spindle member 20 has a ground engaging support wheel 22 rotatably journaled thereon and it will be noted that the front spindles 20 each have steering arms 24 which are interconnected by means of a tie rod 26. A steering tongue 28 is pivotally secured to the front transverse frame member 18 and to the approximate center point of the tie rod 26.

The rear spindles 20 each has a steering arm 30 secured thereto and the steering arms 30 are interconnected by means of a tie rod 32. A steering tongue 34 is pivotally secured to the center of the transverse frame member 16 and to the approximate midportion of the tie rod 32. One pair of remote ends of the side or longitudinal frame members 12 and 14 are provided with locking brackets 36 and 38 respectively and it may be seen from a comparison of FIGURES 4 and 5 of the drawings that the steering tongues 28 and 34 may be secured in a laterally directed position by means of the locking brackets 36 and 38 in order that the wheels 22 will be pointed to the side of the trailer 10. In this manner, the trailer 10 may move laterally as well as longitudinally.

Figure 2:
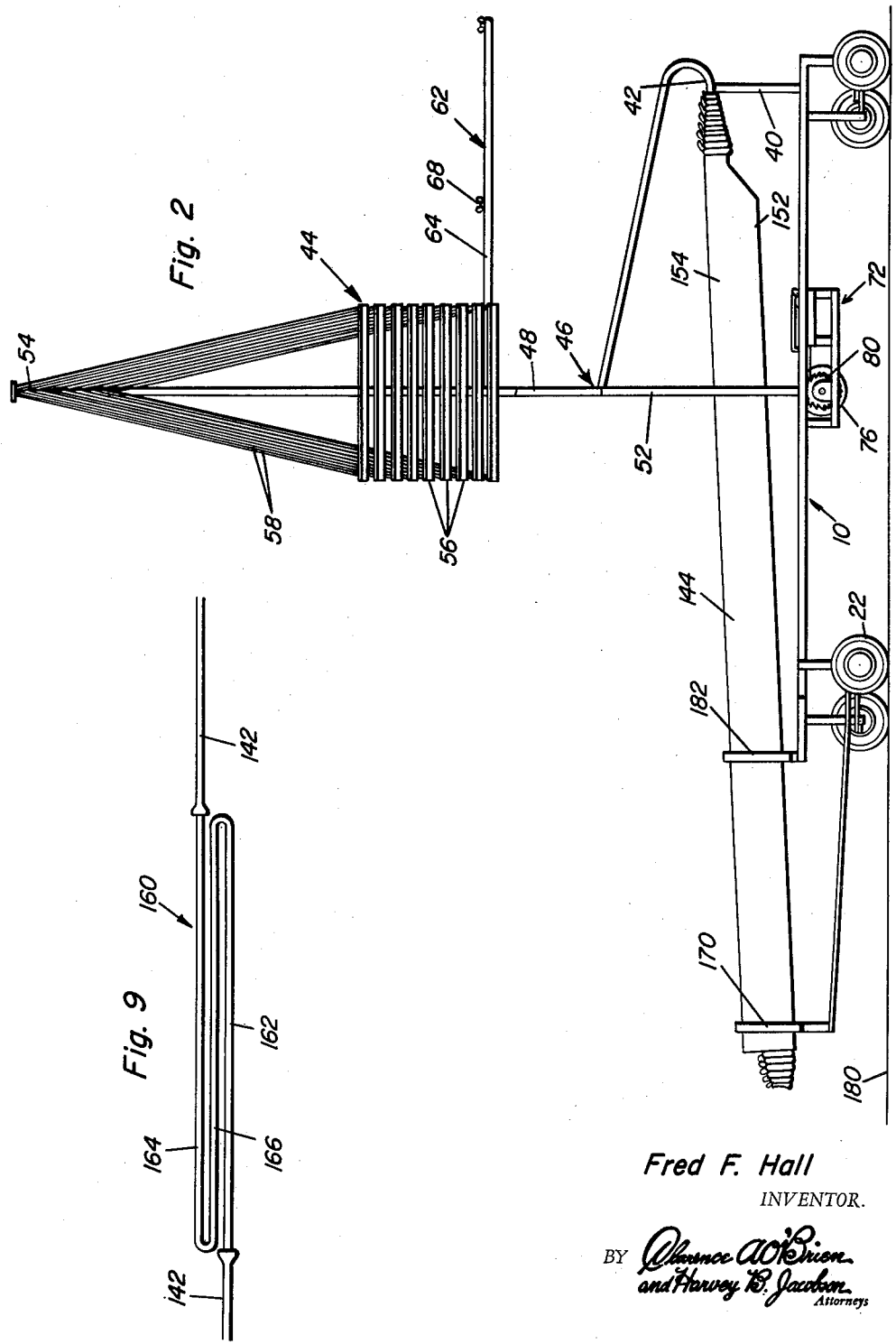
FIGURE 2 is a side elevational view of the irrigation trailer shown with portions of the telescopically engaged conduit sections removed.
Figure 3:
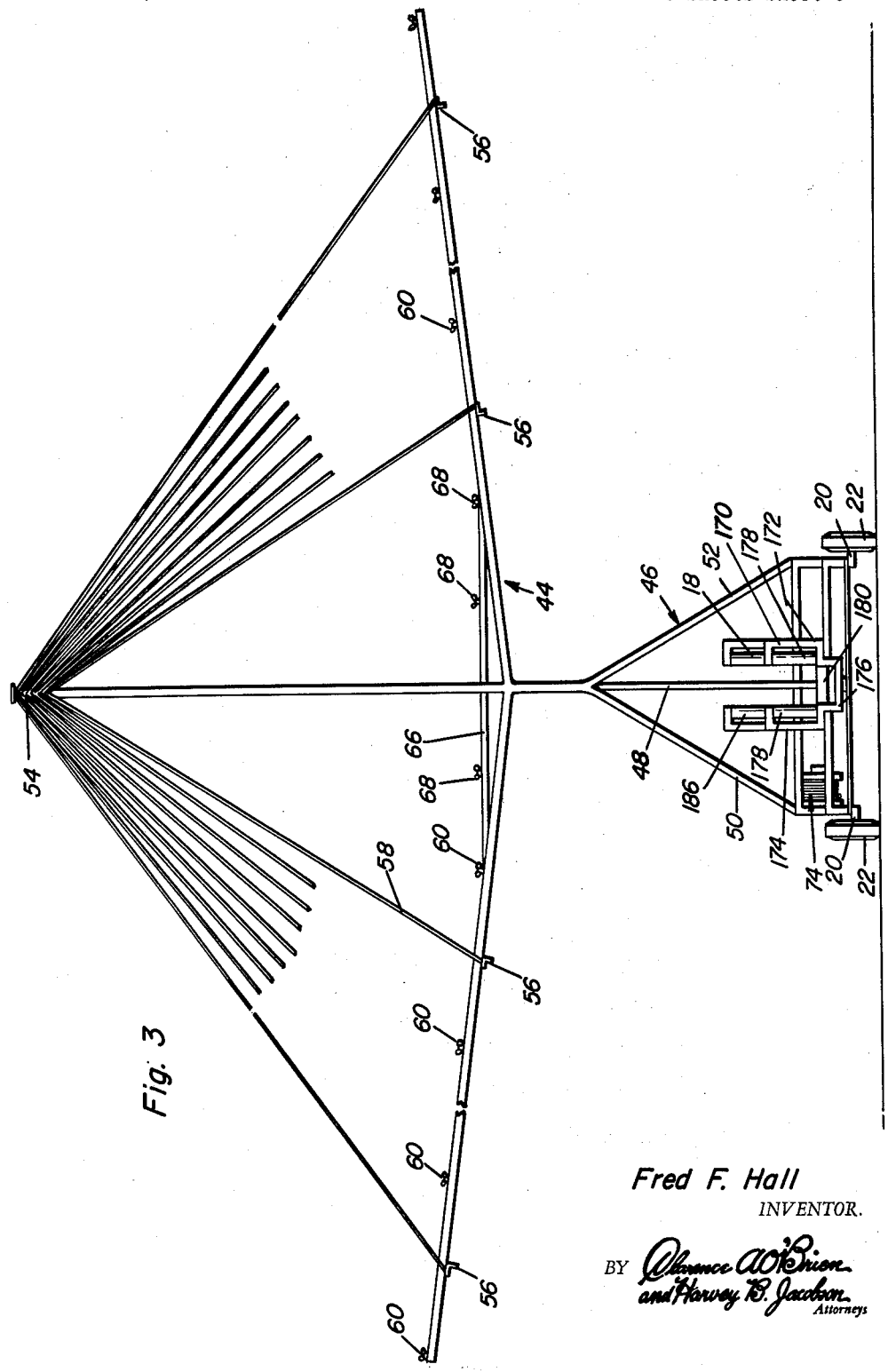
FIGURE 3 is a front end elevation view of the irrigation trailer.

With attention now directed to FIGURE 2 of the drawings, it will be seen that the trailer 10 includes a support 40 which supports one end of a delivery conduit 42 in a fixed position on the trailer 10. The delivery conduit 42 is in turn communicated with an elevated elongated and transversely extending hollow manifold boom generally referred to by the reference numeral 44. The manifold boom 44 is supported in an elevated position above the frame of the trailer 10 by means of a mast assembly generally referred to by the reference numeral 46. The mast assembly 46 includes a center support 48 and inclined opposite side supports 50 and 52. The center support 48 extends upwardly beyond the manifold boom 44 and has a plurality of anchoring members 54 secured to its upper end. The boom 44 includes a plurality of transversely extending cross arms 56 which are secured to the manifold boom 44 at their approximate midportions. Each end of each cross arm 56 is connected to a corresponding anchoring member 54 by means of a supporting cable 58 and it will be seen that a plurality of outlet nozzles 60 are spaced longitudinally along the manifold boom 44. It is to be understood that the outlet nozzles 60 are communicated with the interior of the manifold boom 44 and that a portion of the center support 48 communicates the end of the discharge conduit 42 remote from the support 40 with the manifold boom 44.

In addition to the manifold boom 44, the liquid dispensing means of the trailer 10 includes a generally rectangular extension referred to in general by the reference numeral 62. The extension 62 includes opposite side conduits 64 which project away from the manifold boom 44 on opposite sides of the center support 48 and are interconnected at their free ends by means of a cross conduit 66. The conduits 64 and 66 are each also provided with outlet nozzles that are referred to by the reference numerals 68.

A winch assembly is supported from the main frame of the trailer 10 by means of a winch frame generally referred to by the reference numeral 72 and the winch assembly is referred to in general by the reference numeral 74 and comprises the motive force for propelling the trailer 10. The winch assembly 74 has a winding drum 76 which is rotatably supported from the winch frame 72 and has one end of a flexible pull member 78 wound thereabout. A ratchet wheel 80 is also secured to the winding drum 76 and a liquid powered motor means generally referred to by the reference numeral 82 is drivingly connected to the ratchet wheel 80 by means of a push rod 84. The motor means 82 includes a cylinder member 86 in which there is disposed a reciprocatory piston 88 to which one end of the push rod or piston rod 84 is secured. The push rod 84 extends through an aperture 90 formed in one end wall 92 of the cylinder member 86 and the other end of the cylinder member 86 is closed by means of an end wall 94. An inlet pipe 98 is communicated with the end of the cylinder member 86 adjacent the end wall 94 and it may be seen that the end wall 94 includes an abutment 100 for limiting movement of the piston 88 theretoward. A seep outlet 102 is also provided in the end of the cylinder member 86 adjacent the end wall 94 and is controlled by means of a pet cock 104.

A control valve generally referred to by the reference numeral 106 is operatively disposed within the inlet line or conduit 98 and includes a rotatable actuator 108 having a passage 110 formed therein which is movable into positions communicating the inlet 112 and outlet 114 of the control valve 106.

The rotatable actuator 108 has a lever arm 116 secured thereto and a cam 118 is carried by the control valve 108 and engageable by a roller 120 which is mounted in a slot 122 formed in the lever arm 116. The roller 120 is resiliently urged by means of an expansion spring 123 through the slot 122 toward the rotatable actuator 108 and an abutment arm 121 is carried by the piston rod 84. The piston rod 84 is resiliently urged toward a position with the piston 88 disposed against the abutment 100 by means of an expansion spring 124 secured between the cylinder member 86 and the abutment arm 121. Accordingly, with the rotatable actuator 108 positioned as viewed in FIGURE 8 of the drawings, water under pressure will pass through the inlet line 98 and into the adjacent end of the cylinder member 86. Inasmuch as the water enters the cylinder member 86 faster than the water can pass outwardly through the seep outlet 102, the piston 88 is moved toward the remote end of the cylinder member 86 whereupon the push rod 84 engages the teeth 126 on the ratchet wheel 80 to urge rotation of the winding drum against the pull of the cable 78. As the piston 88 approaches the end wall 92, the abutment arm 121 has moved away from the lever arm 116 which is yieldably retained in the position illustrated in FIG- URE 8 of the drawings by means of the thrust of the expansion spring 124. However, when the expansion spring 124 has been stretched a predetermined amount, the lever arm 116 will be swung in a counterclockwise direction as viewed in FIGURE 8 of the drawings and the roller 120 will roll over the cam 118. This will of course rotate the rotatable actuator 108 and terminate communication between the inlet line 98 and the cylinder member 86. Then, the expansion spring 124 will yieldably urge the piston 88 back toward the end wall 94 as the liquid entrapped within the cylinder member 86 passes out through the seep outlet 102. Accordingly, it may be seen that water supplied to the trailer 10 under pressure may be utilized to propel the trailer in a forward direction by means of the winding drum 76 and the cable 78 wound thereon. It is of course to be understood that the free end of the cable 78 is secured to a suitable anchoring means.

With attention now directed to FIGURES 1, 2, 6 and 7 of the drawings, it will be seen that a conduit assembly generally referred to by the reference numeral 140 is provided and that the conduit assembly 140 comprises a plurality of telescopically engaged single conduit sections 142 and double conduit sections 144.

It is to be understood that adjacent conduit sections 142 are snugly telescopically engaged with each other and it will be seen that corresponding ends of the conduit sections 142 are provided with diametrically enlarged collars 146 in which O-ring seals 148 are disposed for sealing engagement with the adjacent end of the conduit section telescopically engaged therein. In addition, each pair of adjacent collars 46 is interconnected by means of a limit cable 150 preventing complete axial separation of adjacent conduit sections 142.

Each of the double conduit sections 144 comprises a pair of laterally spaced conduit halves 152 and 154 which are disposed in side-by-side laterally spaced relation with adjacent portions of the conduit halves 152 and 154 enclosed by means of a jacket 156. Adjacent sides of the conduit halves 152 and 154 have communicating openings 158 formed therein by which the adjacent conduit halves 152 and 154 are communicated.

It may thus be seen that the remote ends of the conduit halves 152 and 154 may each have a conduit section 142 telescopically engaged therein. In this manner, the conduit sections 142, when in the extended positions, may decrease progressively in diameter away from the adjacent double conduit sections 144.

With attention now directed to FIGURE 9 of the drawings, there will be seen a modified form of double conduit sections generally referred to by the reference numeral 160. Each of the double conduit sections 160 includes a pair of laterally spaced and generally parallel conduit halves 162 and 164 which are interconnected at remote ends by means of a center conduit section 166. Accordingly, it may be seen that adjacent conduit sections 142 may be telescopically engaged over the remote ends of the half sections 164 and 166. In this manner, the conduit sections 142, adjacent the double conduit section 160 and when in the extended positions, gradually increase in diameter away from the double conduit section 160. Therefore, it may be seen that double conduit sections 160 may be disposed between adjacent ones of the double conduit sections 144 and in this manner, a plurality of conduit sections 142 may be telescopically engaged with adjacent sections and communicated with each other and be limited in number only by the load carrying capacity of the trailer with which they are operatively associated. Accordingly, it may be readily seen that well in excess of one-half mile of conduit sections may be carried by each trailer 10.

With attention again directed to FIGURE 2 of the drawings, it may be seen that the steering tongue 28 includes a guide member 170 adapted to embracingly engage the conduit sections being loaded onto the trailer 10. In this manner, as the guide member 170 engages conduit sections being loaded onto the trailer 10, the trailer 10 may be accurately moved along the conduit sections which are still in the extended positions as the trailer 10 is advanced over the ground 180.

From FIGURE 2 of the drawings it may be seen that the guide member 170 is generally U-shaped in configuration including a pair of upright side arms 172 and 174 and a lower bight portion 176. Each of the arms 172 and 174 rotatably journals a roller 178 for engagement with the opposite sides of the conduit sections being moved onto the trailer 110 and the bight portion 176 includes a horizontally disposed roller 180 for supporting the lower surfaces of the conduit sections being moved onto the trailer 110. In addition, the trailer frame also includes a guide member which is designated by the reference numeral 182 which is constructed in a manner similar to the guide member 170 and includes a pair of side rollers 184 and 186. From FIGURES 2 and 6 of the drawings it will be noted that the half sections 152 and 154 are in vertical alignment and that the forward end of the half section 152 includes a cam block 186 for camming that portion of the double conduit section 144 over the support roller 180.

Figure 1:
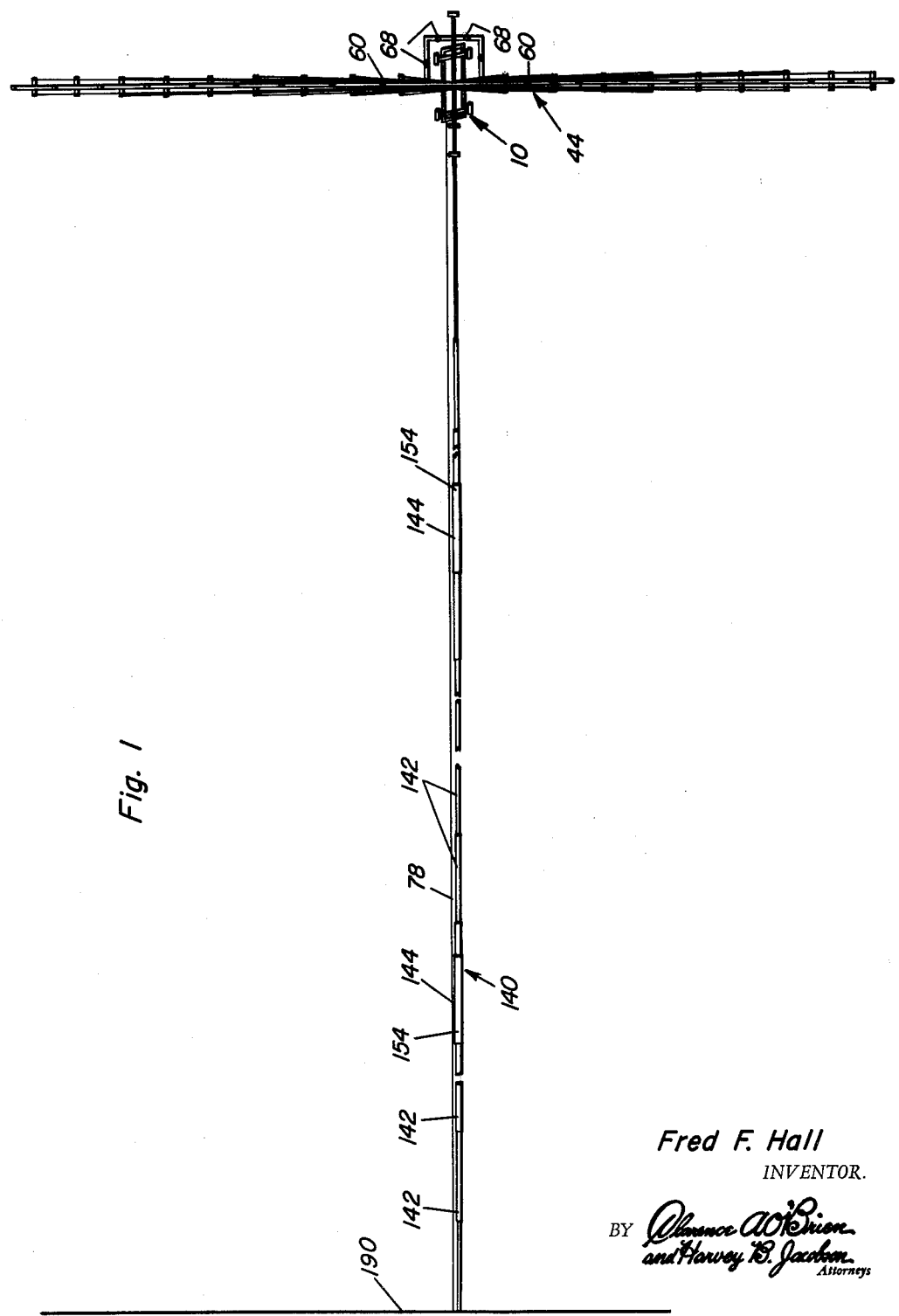
FIGURE 1 is a top plan view of the irrigation trailer.

With attention now directed to FIGURE 1 of the drawings, it may be seen that the outlet nozzles 60 are each utilized to effect a circular spray pattern while the spray nozzles 68 are utilized to spray semi-circular spray patterns extending outwardly away from the portions of the rectangular extensions 62 to which they are secured. In this manner, the discharge of water from the trailer 10 will be to the opposite sides of the supporting wheels 22 and to the rear of the trailer 10. Therefore, it may be seen that the supporting wheels 22 will not be required to travel over soft ground caused by water discharged from the irrigation trailer 10. The extreme extended end of the conduit assembly 140 may be connected in any suitable fashion to a main irrigation header pipe 190. In operation, the trailer 10 is first positioned as viewed in FIGURE 1 of the drawings perhaps one-half mile or more away from the main irrigation header pipe 190. Then, the extreme free end of the conduit assembly 140 may be connected in any suitable manner to the main irrigation header pipe 190 as previously set forth. At the same time, the pull member 78 may be extended and suitably anchored at its free end adjacent the main header pipe 190. Then, the water may be allowed to pass through the conduit assembly 140 whereupon the adjacent ones of the conduit sections 142 will be telescopically engaged with each other toward return positions. As the water travels through the conduit assembly 140, the liquid actuated motor 82 will be actuated in order to intermittently rotate the winding drum 76 of the winch assembly 74. This will of course wind up the flexible pull member 78 and advance the trailer 10 over the ground over which the conduit assembly 140 is extended. After the trailer 10 has reached a position adjacent the main irrigation header pipe 190, and all of the sections 142 have been telescoped to the retracted positions, the free end of the conduit assembly 140 may be disconnected from the main irrigation header pipe 190 and the free end of the pull member 78 may be disconnected from its anchoring member. Then, the steering tongues 28 and 34 of the trailer 10 may be swung to the positions illustrated in FIGURE 5 of the drawings. Then, the trailer 10 may be manually pulled laterally a few hundred feet or less and again operatively connected to a main irrigation pipe which may or may not be the main irrigation pipe 190. If it is desired, a pair of main irrigation header pipes may be provided and disposed in generally parallel relation a half mile or more apart so that the trailer 10 may move back and forth between the header pipes.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An elongated self propelled irrigation vehicle comprising a support frame including ground engaging support wheels, liquid dispensing means on said vehicle including liquid outlets for dispensing liquid over an area of a predetermined pattern and liquid inlet means, said liquid inlet means comprising a plurality of rigid extendable and retractible telescopingly engaged conduit sections, at least one of said conduit sections including a pair of elongated side-by-side conduit halves communicated with each other at one pair of remote end portions and telescopingly engaged with the adjacent conduit sections at the other pair of remote end portions.

2. The combination of claim 1 wherein said other pair of remote end portions are similarly telescopingly engaged with said adjacent conduit sections.

3. An elongated self-propelled irrigation vehicle comprising a support frame including ground engaging support wheels, liquid dispensing means on said vehicle including liquid outlets for dispensing liquid over an area of a predetermined pattern and liquid inlet means, said liquid inlet means comprising a plurality of rigid extendable and retractible telescopingly engaged conduit sections, at least one of said conduit sections including a pair of laterally spaced conduit halves communicated with each other at one pair of remote end portions and telescopingly engaged with the adjacent conduit sections at the other pair of remote end portions, said wheels being steerable and including a steering control adapted to be guided by said conduit sections along which said vehicle is being advanced.

4. An elongated self propelled irrigation vehicle comprising a support frame including ground engaging support wheels, liquid dispensing means on said vehicle including liquid outlets for dispensing liquid over an area of a predetermined pattern and liquid inlet means, said liquid inlet means comprising a plurality of rigid extendable and retractible telescopingly engaged conduit sections, said ground engaging support wheels being disposed in front and rear pairs of steerable opposite side wheels, means interconnecting the wheels of each pair of said wheels for simultaneous steering, each pair of wheels including means for steering said wheels enabling said pairs of wheels to be swung through arcs of at least 90° about upstanding axes between positions with said wheels pointing forwardly of said vehicle and positions pointing to the side of said vehicle whereby the latter may be moved laterally as well as forwardly.

5. An elongated self-propelled irrigation vehicle comprising a support frame including ground-engaging support wheels, liquid dispensing means on said vehicle including liquid outlets for dispensing fluid over an area of a predetermined pattern and liquid inlet means, said liquid inlet means comprising a plurality of rigid extendable and retractible telescopingly engaged conduit sections, said vehicle including winch means having a winding drum, liquid powered motor means drivingly connected with said drum, said liquid motor means including an inlet with which said liquid dispensing means is communicated, said liquid dispensing means including an elevated elongated and transversely extending hollow manifold boom disposed in an upright plane passing forwardly of at least some of said wheels and on which said liquid outlets are disposed whereby as said vehicle moves forwardly said liquid dispensing means may dispense liquid over a wide path, said manifold boom, adjacent said vehicle, including portions disposed to the rear of said some wheels relative to the direction of movement of said vehicle and whose outlets direct the water dispensed therefrom only rearwardly of said portions of said boom relative to the direction of travel of said vehicle.

References Cited in the file of this patent

UNITED STATES PATENTS

| | | |
|---|---|---|
| 1,107,119 | Searle | Aug. 11, 1914 |
| 1,223,246 | Bohnenkemper | Apr. 17, 1917 |
| 1,658,202 | Jones | Feb. 7, 1928 |
| 2,057,217 | Soper | Oct. 13, 1936 |
| 2,064,278 | Tappe | Dec. 15, 1936 |
| 2,575,828 | Muench | Nov. 20, 1951 |
| 2,614,887 | Shields | Oct. 21, 1952 |
| 2,883,116 | Muench | Apr. 21, 1959 |
| 2,896,858 | Price | July 28, 1959 |
| 2,941,727 | Zybach | June 21, 1960 |
| 3,043,520 | Nelson | July 10, 1962 |

FOREIGN PATENTS

| | | |
|---|---|---|
| 377,418 | Great Britain | July 28, 1932 |